(12) United States Patent
Knaust et al.

(10) Patent No.: US 7,540,362 B2
(45) Date of Patent: Jun. 2, 2009

(54) ADJUSTABLE-LENGTH GAS SPRING

(75) Inventors: Holger Knaust, Kümmersbruck (DE); Michael Schmidbauer, Hahnbach (DE)

(73) Assignee: SUSPA Holding GmbH, Altdorf (DE)

( * ) Notice: Subject to any disclaimer, the term of this patent is extended or adjusted under 35 U.S.C. 154(b) by 415 days.

(21) Appl. No.: 11/474,292

(22) Filed: Jun. 26, 2006

(65) Prior Publication Data

US 2006/0290038 A1    Dec. 28, 2006

(30) Foreign Application Priority Data

Jun. 24, 2005    (DE) .................... 10 2005 029 467

(51) Int. Cl.
*F16F 9/34*    (2006.01)
(52) U.S. Cl. .............. 188/322.15; 188/300; 188/319.2; 267/64.12
(58) Field of Classification Search ............... 188/313, 188/315, 316, 317, 319.1, 319.2, 300, 322.13, 188/322.15; 267/64.11, 64.12, 64.13, 64.15; 297/344.12, 344.19
See application file for complete search history.

(56) References Cited

U.S. PATENT DOCUMENTS

| | | | |
|---|---|---|---|
| 2,453,855 A * | 11/1948 | Oliver | 188/300 |
| 4,647,026 A * | 3/1987 | Siemann et al. | 267/64.15 |
| 6,736,380 B2 | 5/2004 | Knapp | |
| 6,986,414 B2 * | 1/2006 | Honig et al. | 188/319.1 |
| 7,152,719 B2 * | 12/2006 | Knaust et al. | 188/322.15 |
| 2002/0017748 A1 * | 2/2002 | Sander et al. | 267/64.12 |
| 2004/0061266 A1 * | 4/2004 | Riel et al. | 267/64.12 |
| 2005/0088021 A1 | 4/2005 | Knaust et al. | |

FOREIGN PATENT DOCUMENTS

| | | |
|---|---|---|
| DE | 36 15 688 A1 | 11/1987 |
| DE | 39 24 309 A1 | 12/1990 |
| DE | 197 47 071 C2 | 4/1999 |
| DE | 100 06 061 A1 | 9/2001 |
| DE | 102 44 671 A1 | 4/2004 |
| DE | 102 52 711 A1 | 5/2004 |
| DE | 103 49 157 A1 | 5/2005 |

* cited by examiner

*Primary Examiner*—Thomas J Williams
(74) *Attorney, Agent, or Firm*—Browdy and Neimark, P.L.L.C.

(57) ABSTRACT

An adjustable length gas spring comprises a casing and a piston which is disposed for displacement in the casing and joined to a piston rod. An externally operable adjusting valve is formed in the piston. Further, the piston is provided with a traction valve, which, upon application of tractive force from outside, cancels any blockage of the piston.

9 Claims, 4 Drawing Sheets

ADJUSTABLE-LENGTH GAS SPRING

BACKGROUND OF THE INVENTION

1. Field of the Invention

The invention relates to an adjustable-length gas spring, the adjusting valve of which can be opened and closed externally, with the piston rod, in the opened condition, can be retracted into, or extracted from, the casing, length adjustments of the gas spring thus being performed. With the adjusting valve closed, the gas spring is blocked in relation to the casing in this set position of the piston rod. In particular when the piston of the gas spring is movable in an interior chamber that is filled with hydraulic oil, the gas spring is rigidly blockable against compression forces.

2. Background Art

Quite a number of adjustable-length gas springs of the generic type have been known, which have additional functions such as an overload protection in which the adjusting valve opens when inadmissible high forces act between the piston rod and the casing.

When adjustable-length gas springs of the species—in particular rigidly blockable gas springs—as mentioned above—filled with hydraulic oil—are used in tables, pivoted head rests of hospital beds, hospital side tables etc., there is a desire for having an increase in length of the gas spring without any need of operation of the adjusting valve.

SUMMARY OF THE INVENTION

It is an object of the invention to embody an adjustable length gas spring of the generic type with an operable adjusting valve in such a way that, with only comparatively slight tractive force being exercised, the piston rod will proceed rapidly from the casing.

According to the invention, this object is attained by the features of claim 1. Based on the measures according to the invention, an additional valve, namely a traction valve, is integrated into the gas spring, opening when a slight tractive force is exercised. A table top, a head rest of a bed, a hospital side table etc. can be lifted by a simple movement of the hand; as soon as this slight tractive force on the gas spring ends, the motion of extension stops immediately and the traction valve shuts off automatically. The adjusting valve itself remains continuously closed in the process.

The sub-claims reflect numerous advantageous embodiments.

Further features, advantages and details of the invention will become apparent from the ensuing description of an exemplary embodiment, taken in conjunction with the drawing.

DESCRIPTION OF THE PREFERRED EMBODIMENT

Figure 1:
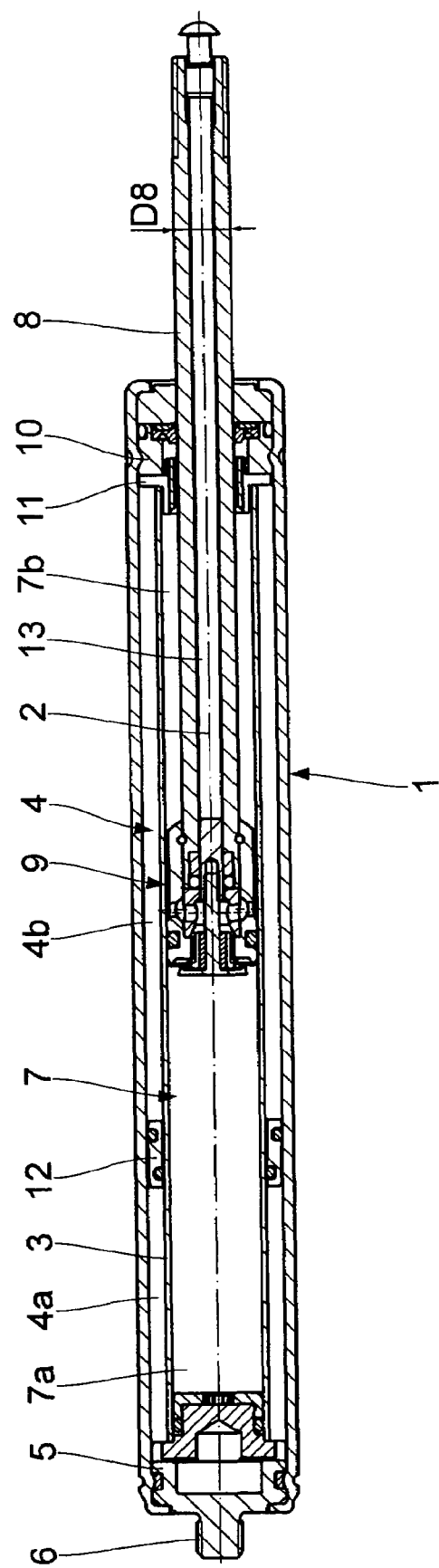
FIG. 1 is a longitudinal sectional view of a gas spring according to the invention.

The adjustable-length gas spring seen in FIG. 1 comprises a cylindrical casing 1 with a central longitudinal axis 2. An internal cylinder 3 is disposed in the casing 1 concentrically of the axis 2, an annular cylindrical chamber 4 being formed between the internal cylinder 3 and the casing 1. One end of the gas spring is closed gas- and liquid-tight by means of a bottom 5. A fastening element in the form of a threaded stem 6 is formed on the outside of the bottom 5. The internal cylinder 3 is joined to the multi-piece bottom 5 for gas- and liquid-tightness so that, in this area, the annular chamber 4 and the interior chamber 7, which is formed in the internal cylinder 3, are separated from each other gas- and liquid-proof.

A piston 9, which mounted on a piston rod 8, is disposed in the internal cylinder 3. The piston rod 8 is extended from the casing 1 of the gas spring by a guide and seal unit 10 that is opposite the bottom 5. The guide and seal unit 10 is customarily sealed towards the casing 1 and towards the piston rod 8. A connecting conduit 11 is provided in the guide and seal unit 10, interconnecting the annular chamber 4 and the interior chamber 7. A annular dividing piston 12 is disposed for displacement in the annular chamber 4; it is sealed towards the casing 1 and towards the internal cylinder 3. It divides the annular chamber 4 into a divisional annular chamber 4a which adjoins the bottom 5 and is filled with compressed gas, and a divisional annular chamber 4b which adjoins the guide and seal unit 10 and is filled with hydraulic oil. The piston 9 divides the interior chamber 7 of the internal cylinder 3 into a divisional interior chamber 7a in vicinity to the bottom 5 and a divisional interior chamber 7b in vicinity to the seal and guide unit 10. Both the interior chamber 7 and the divisional annular chamber 4b are filled with hydraulic fluid.

The piston rod 8 is tubular i.e., hollow; an actuating rod 13 is disposed therein, which is displaceable from the outer end in the direction of the axis 2. The piston 9 is provided with a bell-shaped valve. It has an approximately tubular valve box 14 that is fixed to the piston rod 8 in the direction of the axis 2 by means of a retaining ring 15.

An overflow chamber 16 is formed in the piston 9; it is durably connected to the divisional interior chamber 7b by means of overflow ducts 17 which are radial to the axis 2. The piston 9 is sealed towards the inside wall 19 of the internal cylinder 3 by means of an annular seal 18. This annular seal 18 is located in the area of the piston 9 that is situated between the overflow ducts 17 and the divisional interior chamber 7a so that, on the one hand, the divisional interior chambers 7a and 7b are separated liquid-tight from one another by this annular seal 18 and, on the other hand, connecting the two divisional interior chambers 7a and 7b is still feasible by way of the overflow ducts 17 and the overflow chamber 16 in a manner still to be described.

A valve control pin 20 is disposed in the valve box 14 for displacement in the direction of the axis 2, on the one hand bearing against the end, inside the piston rod 8, of the actuating rod 13 and on the other hand, at its opposite end, being provided with a valve tray 21. The valve control pin 20 is guided in a guide bush 22 inside the piston rod 8 radially of the axis 2 and sealed by an annular seal 23 so that no hydraulic oil can leak outwards from the interior chamber 7 through the hollow piston rod 8.

The valve tray 21, on its outer rim, comprises a first annular sealing seat 24 that is turned towards the piston 9. A first sealing surface 25, as a first sealing contact surface, is allocated to this first sealing seat 24; it is mounted on a sliding bush 26. This sliding bush 26 is guided for displacement in the direction of the axis 2 on the valve control pin 20. On its periphery, it comprises passages 27 which run in parallel to the axis 2 and which, on the one hand, are radially open externally and, on the other hand, mouth through ports 28 into the area within the first annular sealing seat 24 of the valve tray 21. In this area of the passage 28, the sliding bush 26 is provided with a valve disk 29 of radial extension which consists of some sealing material on both front sides. For example, the valve disk 29 is a steel disk that is provided with a rubber layer 30 and 31 on both front sides. The rubber layer 30 constitutes the first sealing surface 25.

An annular second sealing seat 32 is formed on the front side, turned towards the valve disk 29, of the valve box 14; the valve disk 29 can bear against it by its rubber layer 31 as a second sealing surface i.e., as a second sealing contact surface. This second sealing seat 32 is located constructionally as close as possible to the inside wall 19 of the internal cylinder 3.

The passages 27 are separated from one another by means of guiding ribs 33 which extend radially to the axis 2. By means of these ribs 33, the sliding bush 26 is guided in a cylindrical bore 34 of the valve box 14 for displacement in the direction of the axis 2. This cylindrical bore 34 is again connected to the overflow chamber 16. Radially to the axis 2, the passages 27 open into the second valve chamber 35 which is defined by the valve disk 29 and its rubber layer 31, the second annular sealing seat 32 and the valve box 14. The passages 27 discharge through the port 28 into a first valve chamber 36 which is defined by the valve tray 21, the first annular sealing seat 24 thereof, the first sealing surface 25 and the sliding bush 26.

The valve control pin 20 with the valve tray 21 and the associated actuating rod 13, the valve disk 29 with the rubber layer 30, and the passages 27 with their ports 28, and the overflow chamber 16 with the overflow ducts 17 constitute an adjusting valve 37. The sliding bush 26 with its radially opening passages 27, the valve disk 29 with its rubber layer 31 as a second sealing surface, the second sealing seat 32, and the overflow chamber 16 with the overflow ducts 17 constitute a traction valve 38.

The first sealing seat 24 has a diameter $D_{24}$; the second sealing seat 32 has a diameter $D_{32}$. The piston rod 8 has an outside diameter $D_8$; the inside wall 19 of the internal cylinder 3 has an inside diameter $D_{19}$. As mentioned above, $D_{32}$ is a great as possible i.e., $D_{32}$ is negligibly smaller than $D_{19}$. It must be ensured that, with the traction valve 38 open, a gap 39 is available between the valve disk 29 and the inside wall 19 of the internal cylinder 3, this gap 39 being sufficiently dimensioned for liquid to pass through. As for the diameter of the valve disk 29, $D_{19}>D_{29}>D_{32}$ applies. Furthermore, $D_{24}<D_{32}$ applies. Fundamentally, the sealing seats 24, 32 can also be formed on the sliding bush 26, and the sealing surfaces 25, 31 on the valve tray 21 or on the valve box 14.

Figure 2:
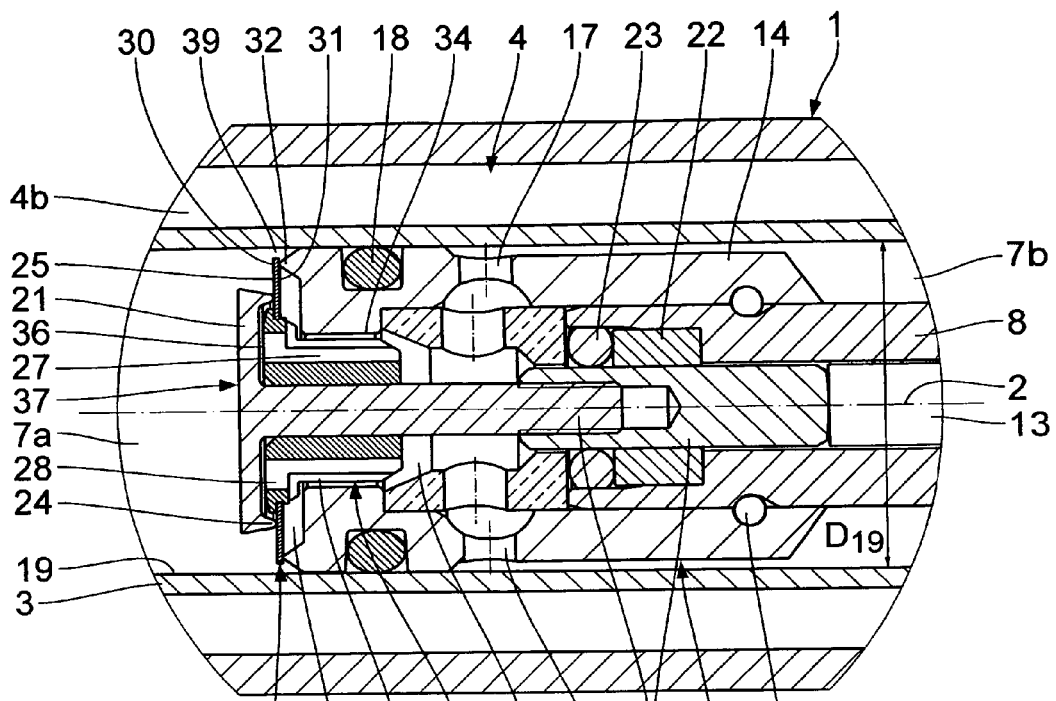
FIG. 2 is a view, on an enlarged scale, of details of FIG. 1, showing the piston with both the adjusting valve and the traction valve shut off.
Figure 3:
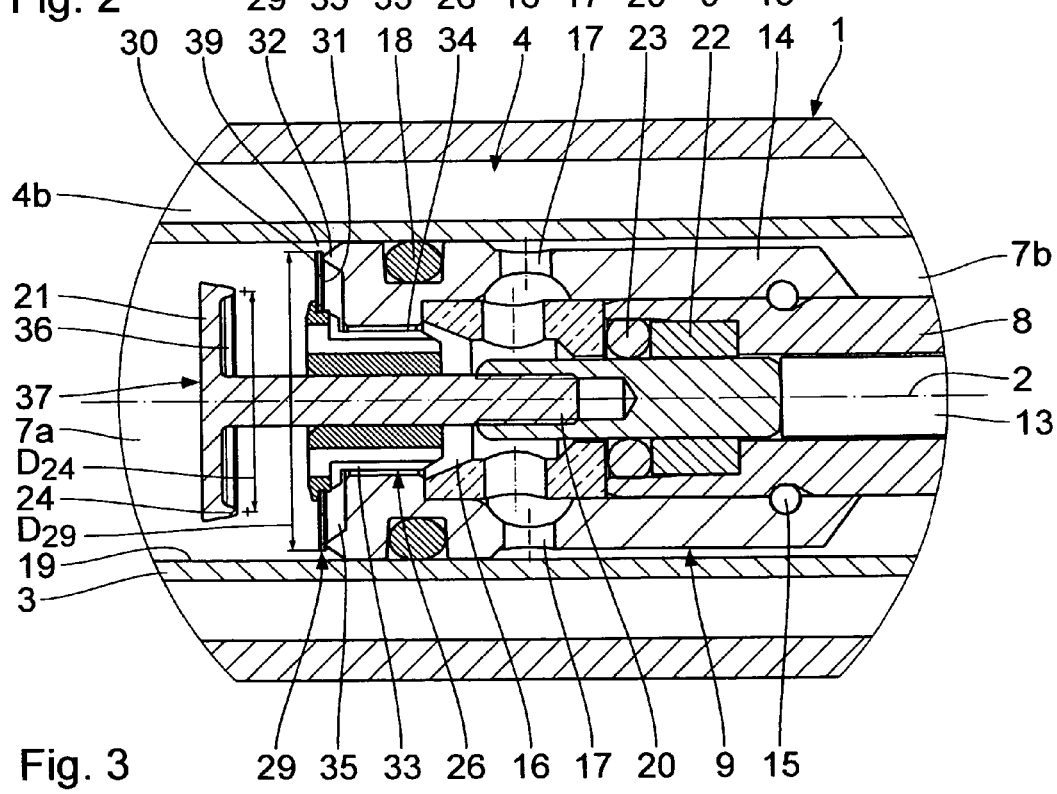
FIG. 3 is an illustration, corresponding to FIG. 2, with the adjusting valve open and the traction valve closed.
Figure 4:
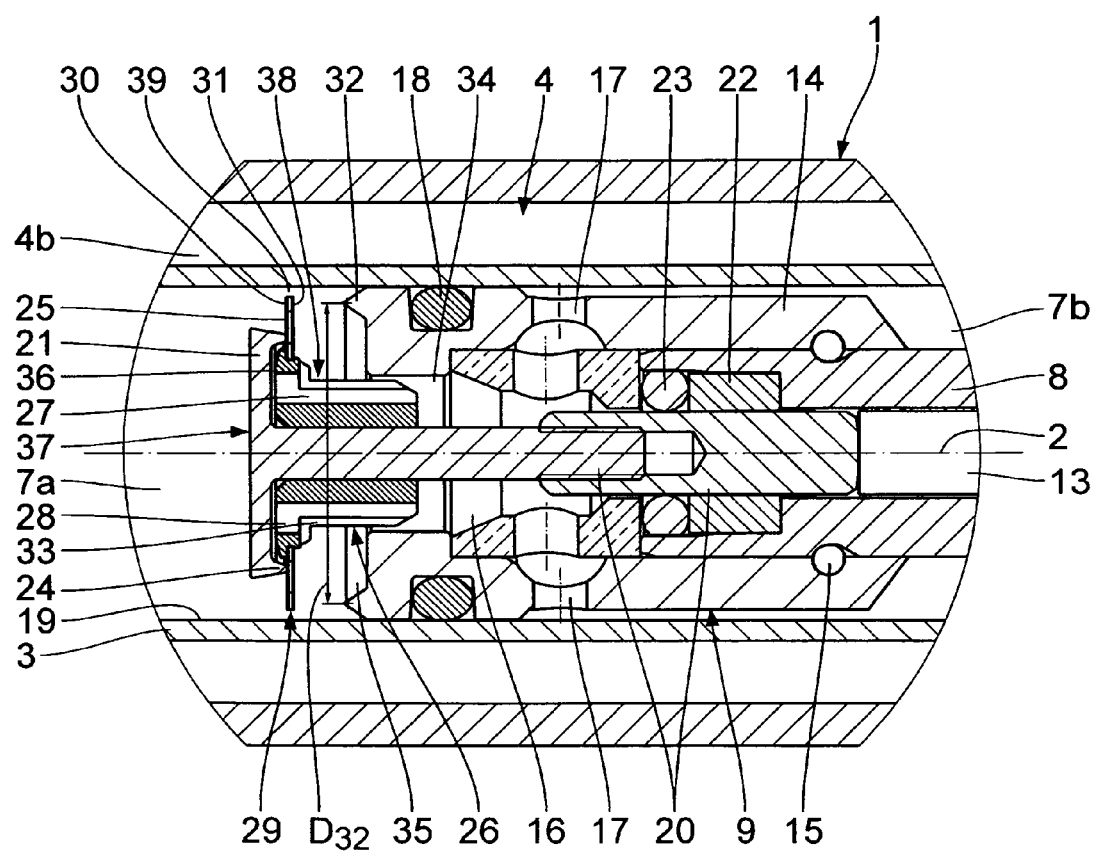
FIG. 4 is an illustration, corresponding to FIGS. 2 and 3, with the traction valve open and the adjusting valve closed.
Figure 5:
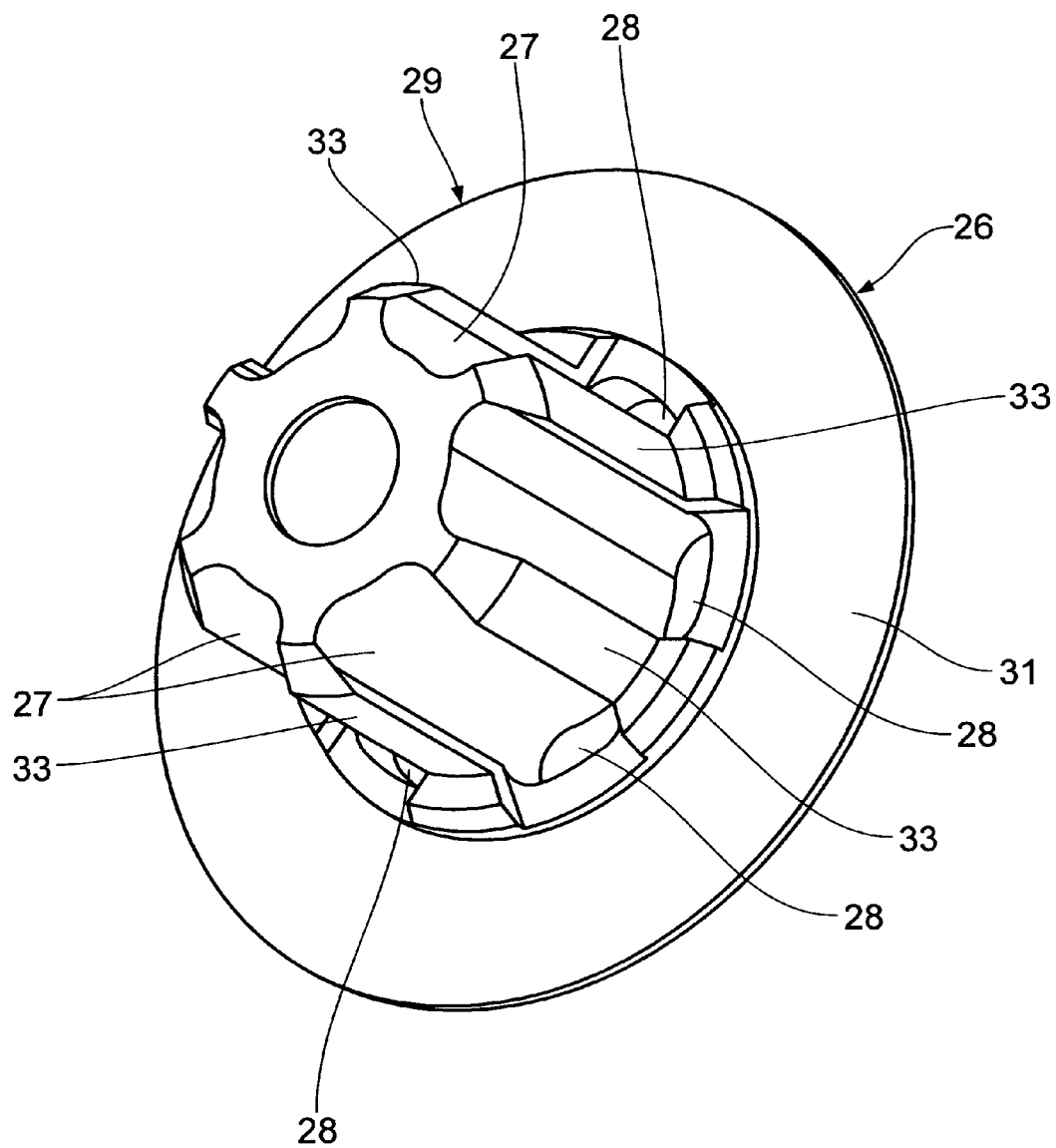
FIG. 5 is a perspective view of a sliding bush of the adjusting valve and the traction valve.

The mode of operation of the described bell-shaped valve will become apparent from FIGS. 2 to 4. With the adjusting valve 37 shut off according to FIG. 2 and the traction valve 38 shut off, no hydraulic oil can flow from the divisional interior chamber 7a into the divisional interior chamber 7b and vice versa. The piston 9, with the piston rod 8, is fixed in relation to the casing 1 in the direction of the axis 2. Length adjustment of the gas spring is blocked. Any force acting on the external end of the piston rod 8 and directed towards the casing 1 does not cause the gas spring to be pushed together. The valve tray 21, by its first sealing seat 24, rests sealingly on the rubber layer 30 of the valve disk 29. The valve disk 29 tightly bears by its rubber layer 31 against the sealing seat 32. Consequently, both valves 37, 38 are closed.

When the actuating rod 13 is being pushed into the piston rod 8, it displaces the valve control pin 20 and the valve tray 21 in a direction towards the divisional interior chamber 7a, thereby opening the adjusting valve 37. The first sealing seat 24 is lifted off the rubber layer 30 of the valve disk 29 so that hydraulic oil can flow from the divisional interior chamber 7b through the overflow ducts 17, the overflow chamber 16, the passages 27, the ports 28 and the first valve chamber 36 into the divisional interior chamber 7a and vice versa. The gas spring can be regulated in length by corresponding flow of hydraulic oil from the divisional interior chamber 7a into the divisional interior chamber 7b and vice versa. Upon insertion of the piston rod 8 into the casing 1, hydraulic oil is displaced from the interior chamber 7 and pressed into the divisional interior chamber 7b, the dividing piston 12 thereby being moved in a direction towards the bottom 5 with the divisional interior chamber 7a being correspondingly reduced in size. Upon extension of the piston rod 8 from the casing 1, the flow of hydraulic oil is reversed. The sum of the cross sections of the passages 27 and ports 28 is as great as possible so that possibly no, or only inferior, damping forces occur during the adjusting motion. Upon opening, as described, of the adjusting valve 37, the sliding bush 26 stays in the position seen in FIGS. 2 and 3 in the cylindrical bore 34 of the valve box 14 i.e., the traction valve 38 is kept shut off at least upon insertion of the piston rod 8.

When tractive force is exercised on the piston rod 8 in relation to the casing 1 while the adjusting valve 37 is closed i.e., when a tractive force acts between the casing 1 and the piston rod 8 that is intended for extension of the piston rod 8 from the casing 1, this will lead to pressure increase in the divisional interior chamber 7b. On the one hand, this pressure, within the first sealing seat 24, acts on the valve tray 21 in a direction towards the divisional interior chamber 7a and on the other hand, within the second sealing seat 32, on the valve disk 29 and thus on the sliding bush 26. As for the active surface $F_{37}$ which the hydraulic oil acts on in this regard, $F_{37}=(D^2_{24}-D^2_8)\times\pi/4$ applies. As for the active surface of the traction valve $F_{38}$, $F_{38}=(D^2_{32}-D^2_8)\times\pi/4$ applies. With $D_{32}>D_{24}$, the force that acts of the sliding bush 26 with the valve disk 29 in a direction towards the divisional interior chamber 7a exceeds the force that acts on the valve tray 21. Consequently, the traction valve 38 is opened so that hydraulic oil can flow from the divisional interior chamber 7b through the overflow ducts 17, the overflow chamber 16, the passages 27 of the sliding bush 26, the second valve chamber 35, via the second sealing seat 32 and the gap 39, into the divisional interior chamber 7a. With correspondingly low tractive force acting on the piston rod 8, the traction valve 38 opens; the piston rod 8 is pushed out of the casing 1 by the pressure of the gas inside the divisional annular chamber 4a. The required force results from the dimensioning of $F_{37}$ and $F_{38}$ and the pressure of the gas inside the divisional annular chamber 4a. The motion of extension stops immediately when the mentioned inferior tractive force is no longer exercised. As seen in FIG. 4, the sliding bush 26 is not displaced sufficiently far for exit from the cylindrical bore 34; it is guided in this bore 34 even with the traction valve 38 open.

What is claimed is;
1. An adjustable-length gas spring, comprising
a casing (1) which has a central longitudinal axis (2) and is filled with a liquid pressure fluid;
a guide and seal unit (10) which closes the casing (1) at a first end;

a piston rod (8) for sealed guidance through the guide and seal unit (10) out of the first end of the casing (1);

a piston (9) for sealed guidance in the casing (1), the piston (9) being joined to the piston rod (8);

a first divisional interior chamber (7b) which is formed between the piston (9) and the guide and seal unit (10);

a second divisional interior chamber (7a) which is defined by the piston (9) and turned away from the first divisional interior chamber (7b);

an adjusting valve (37) which is disposed in the piston (9) and interconnects the first and second divisional interior chamber (7a, 7b), having a valve control pin (20) which is displaceable in a direction of the central longitudinal axis (2), a valve tray (21) which is mounted on the valve control pin (20), a first sealing seat (24), and a first sealing contact surface which cooperates with the first sealing seat (24), the first sealing seat (24) and the first sealing contact surface being liftable off each other by means of the valve control pin (20);

a traction valve (38), which is disposed on the piston (9), for interconnection of the first and second divisional interior chamber (7a, 7b) when tractive force acts between the piston rod (8) and the casing (1), the traction valve (38) having a second sealing seat (32), and a second sealing contact surface that cooperates with the second sealing seat (32), the second sealing seat (32) and the second sealing contact surface, upon increase of pressure in the first divisional interior chamber (7b), being liftable off each other while the traction valve (38) opens; and the adjusting valve (37) and the traction valve (38) having a joint sliding bush (26) which is guided for displacement on the valve control pin (20) in the direction of the central longitudinal axis (2) and bears either the first or second sealing contact surface or the first or second sealing seat (24, 32).

2. An adjustable-length gas spring, comprising a casing (1) which has a central longitudinal axis (2) and is filled with a liquid pressure fluid;

a guide and seal unit (10) which closes the casing (1) at a first end;

a piston rod (8) for sealed guidance through the guide and seal unit (10) out of the first end of the casing (1);

a piston (9) for sealed guidance in the casing (1), the piston (9) being joined to the piston rod (8);

a first divisional interior chamber (7b) which is formed between the piston (9) and the guide and seal unit (10);

a second divisional interior chamber (7a) which is defined by the piston (9) and turned away from the first divisional interior chamber (7b);

an adjusting valve (37) which is disposed in the piston (9) and interconnects the first and second divisional interior chamber (7a, 7b), having a valve control pin (20) which is displaceable in a direction of the central longitudinal axis (2), a valve tray (21) which is mounted on the valve control pin (20), a first sealing seat (24), and a first sealing contact surface which cooperates with the first sealing seat (24), the first sealing seat (24) and the first sealing contact surface being liftable off each other by means of the valve control pin (20);

a traction valve (38), which is disposed on the piston (9), for interconnection of the first and second divisional interior chamber (7a, 7b) when tractive force acts between the piston rod (8) and the casing (1), the traction valve (38) having a second sealing seat (32), and a second sealing contact surface that cooperates with the second sealing seat (32), the second sealing seat (32) and the second sealing contact surface, upon increase of pressure in the first divisional interior chamber (7b), being liftable off each other while the traction valve (38) opens; and the adjusting valve (37) and the traction valve (38) having a joint sliding bush (26) which is guided for displacement on the valve control pin (20) in the direction of the central longitudinal axis (2) and bears either the first or second sealing contact surface or the first or second sealing seat (24, 32), wherein the adjusting valve (37), when shut off, has a surface $F_{37}$ which is in connection with the first divisional interior chamber (7b);

wherein the traction valve (38), when shut off, has a surface $F_{38}$ which is in connection with the first divisional interior chamber (7b); and wherein $F_{38} > F_{37}$ applies.

3. A gas spring according to claim 1, wherein the sliding bush (26) has passages (27) which are allocated to the adjusting valve (37) and the traction valve (38).

4. An adjustable-length gas spring, comprising a casing (1) which has a central longitudinal axis (2) and is filled with a liquid pressure fluid;

a guide and seal unit (10) which closes the casing (1) at a first end;

a piston rod (8) for sealed guidance through the guide and seal unit (10) out of the first end of the casing (1);

a piston (9) for sealed guidance in the casing (1), the piston (9) being joined to the piston rod (8);

a first divisional interior chamber (7b) which is formed between the piston (9) and the guide and seal unit (10);

a second divisional interior chamber (7a) which is defined by the piston (9) and turned away from the first divisional interior chamber (7b);

an adjusting valve (37) which is disposed in the piston (9) and interconnects the first and second divisional interior chamber (7a, 7b), having a valve control pin (20) which is displaceable in a direction of the central longitudinal axis (2), a valve tray (21) which is mounted on the valve control pin (20), a first sealing seat (24), and a first sealing contact surface which cooperates with the first sealing seat (24), the first sealing seat (24) and the first sealing contact surface being liftable off each other by means of the valve control pin (20);

a traction valve (38), which is disposed on the piston (9), for interconnection of the first and second divisional interior chamber (7a, 7b) when tractive force acts between the piston rod (8) and the casing (1), the traction valve (38) having a second sealing seat (32), and a second sealing contact surface that cooperates with the second sealing seat (32), the second sealing seat (32) and the second sealing contact surface, upon increase of pressure in the first divisional interior chamber (7b), being liftable off each other while the traction valve (38) opens; and the adjusting valve (37) and the traction valve (38) having a joint sliding bush (26) which is guided for displacement on the valve control pin (20) in the direction of the central longitudinal axis (2) and bears either the first or second sealing contact surface or the first or second sealing seat (24, 32), wherein the sliding bush (26) supports a valve disk (29) on which the first sealing contact surface and the second sealing contact surface are formed.

5. A gas spring according to claim 4, wherein the valve disk (29) comprises sealing material on both sides.

6. A gas spring according to claim 4, wherein a gap (39) is formed between the valve disk (29) and an inside wall (19) that defines the divisional interior chambers (7a, 7b).

7. An adjustable-length gas spring, comprising
a casing (1) which has a central longitudinal axis (2) and is filled with a liquid pressure fluid;
a guide and seal unit (10) which closes the casing (1) at a first end;
a piston rod (8) for sealed guidance through the guide and seal unit (10) out of the first end of the casing (1);
a piston (9) for sealed guidance in the casing (1), the piston (9) being joined to the piston rod (8);
a first divisional interior chamber (7b) which is formed between the piston (9) and the guide and seal unit (10);
a second divisional interior chamber (7a) which is defined by the piston (9) and turned away from the first divisional interior chamber (7b);
an adjusting valve (37) which is disposed in the piston (9) and interconnects the first and second divisional interior chamber (7a, 7b), having
a valve control pin (20) which is displaceable in a direction of the central longitudinal axis (2),
a valve tray (21) which is mounted on the valve control pin (20),
a first sealing seat (24), and
a first sealing contact surface which cooperates with the first sealing seat (24),
the first sealing seat (24) and the first sealing contact surface being liftable off each other by means of the valve control pin (20);
a traction valve (38), which is disposed on the piston (9), for interconnection of the first and second divisional interior chamber (7a, 7b) when tractive force acts between the piston rod (8) and the casing (1), the traction valve (38) having
a second sealing seat (32), and
a second sealing contact surface that cooperates with the second sealing seat (32),
the second sealing seat (32) and the second sealing contact surface, upon increase of pressure in the first divisional interior chamber (7b), being liftable off each other while the traction valve (38) opens; and
the adjusting valve (37) and the traction valve (38) having a joint sliding bush (26) which is guided for displacement on the valve control pin (20) in the direction of the central longitudinal axis (2) and bears either the first or second sealing contact surface or the first or second sealing seat (24, 32),
wherein the first sealing seat (24) has the shape of a circular ring and a diameter $D_{24}$; and wherein the second sealing seat (32) has the shape of a circular ring and a diameter $D_{32}$; and wherein $D_{32} > D_{24}$ applies.

8. A gas spring according to claim 1, wherein an equalization chamber is provided, which is filled with compressed gas and connected to one of the divisional interior chambers (7b).

9. A gas spring according to claim 8,
wherein the divisional interior chambers (7a, 7b) are formed in an internal cylinder (3) which, concentrically of the central longitudinal axis (2), is enveloped by a casing (1);
wherein an annular chamber (4), which is formed between the casing (1) and the internal cylinder (3), is divided by a dividing piston (12) into a divisional annular chamber (4a) filled with compressed gas and a divisional annular chamber (4b) filled with liquid pressure fluid; and
wherein the divisional annular chamber (4b), which is filled with pressure fluid, is permanently connected to the first divisional interior chamber (7b) via a connecting conduit (11).

* * * * *